May 22, 1956
T. B. JACKSON
2,746,833
METHOD AND APPARATUS FOR CONTINUOUSLY
REDUCING RECORDED TELEMETRIC DATA
Filed April 13, 1953
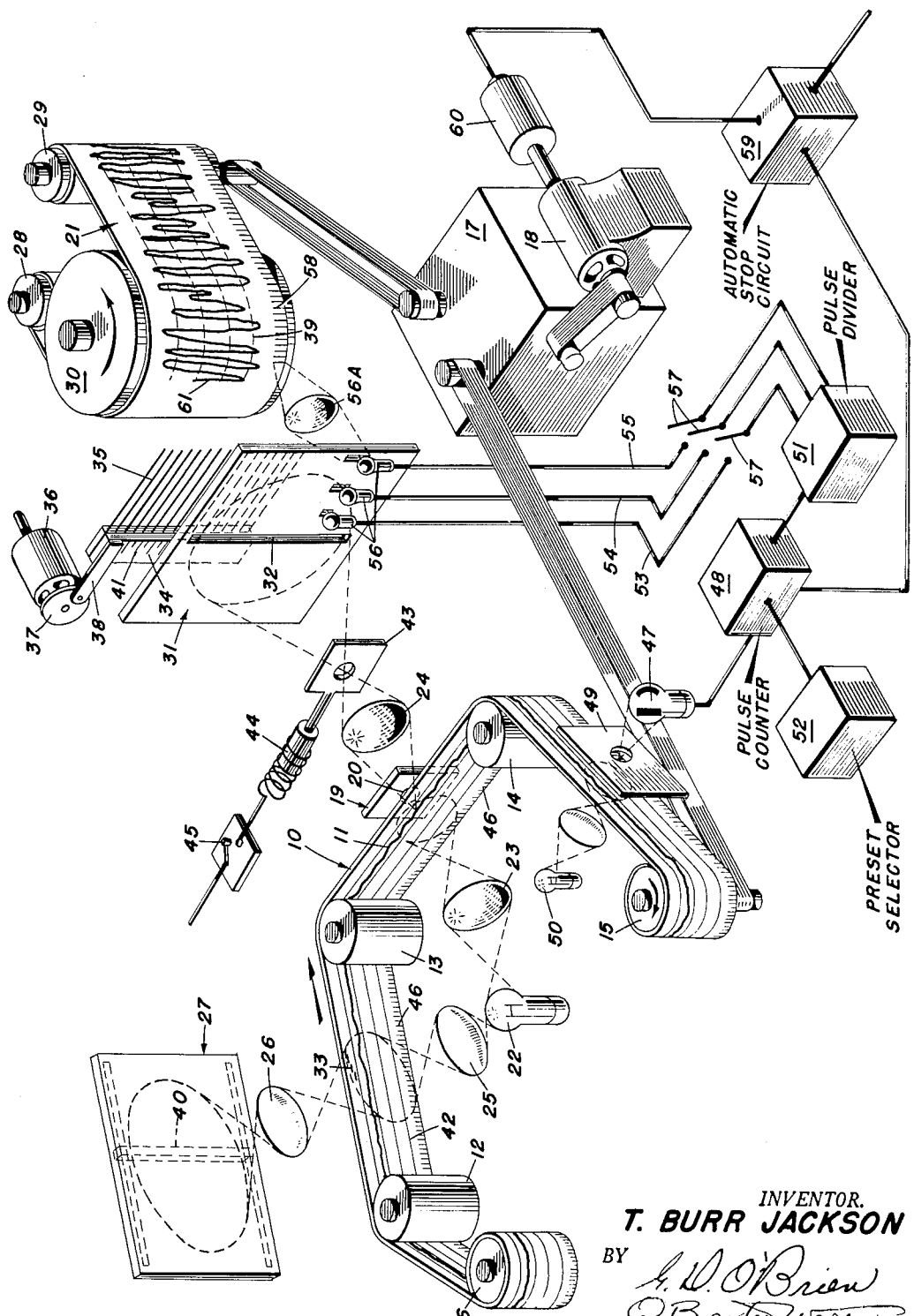
INVENTOR.
T. BURR JACKSON
BY
ATTORNEYS United States Patent Office 2,746,833
Patented May 22, 1956

2,746,833

METHOD AND APPARATUS FOR CONTINUOUSLY REDUCING RECORDED TELEMETRIC DATA

T. Burr Jackson, Riverside, Calif., assignor to the United States of America as represented by the Secretary of the Navy Application April 13, 1953, Serial No. 348,603

6 Claims. (Cl. 346—107)

(Granted under Title 35, U. S. Code (1952), sec. 266)

The invention described herein may be manufactured and used by or for the Government of the United States of America for governmental purposes without the payment of any royalties thereon or therefor.

This invention relates to a method and device for altering the scale of recorded data and more particularly to an apparatus for and method of continuously reproducing a telemetric film record whereby to reduce the overall length of and amplify the fluctuations in a selected recorded function.

During test flights of guided missiles information relating to various performance characteristics of the missile, such as fuel consumption rate, acceleration, altitude, etc., is relayed by means of telemetering equipment to the ground control station where it is recorded on a recording instrument, usually comprising 35 millimeter film. The resulting film record comprises a plurality of traces or performance characteristic lines, and their respective reference lines, concentrated across the width of the film. Since the flight of the missile continues for some period of time, the record film is usually several yards long, and to enable this record to be interpreted and the characteristics of the missile ascertained it has been necessary in the past to enlarge the record by projecting it upon a screen a portion at a time. Thus, the operator has heretofore been unable to obtain an overall picture of the missile performance since he was able to view only a small portion of the recorded information at any one time.

The present invention obviates the difficulties which have arisen in the past by providing an apparatus whereby one recorded trace, or performance characteristic line, such as altitude, speed, or acceleration, may be selected from the film record and reproduced in such a manner as to amplify fluctuations therein and decrease the overall length thereof so as to enable the operator to view a substantial portion of the record. In addition to the traces representing the performance characteristics of the missile there are also recorded on the telemetric record film "in flight calibration pulse marks," or reference indicia, which are formed by pulses transmitted periodically from the missile to enable measurements to be made of the true value of a function, and indicia constituting a time scale, which permit determinations to be made of the time intervals between various points on the record. The instant invention provides means for reproducing these indicia on the recording instrument and in the proper relationship to and simultaneously with the reproduction of the reduced performance characteristic line or trace.

Accordingly it is an object of the present invention to provide a method and device for continuously altering the scale of a record instrument.

Another object is to provide an apparatus and method for continuously reproducing on a related scale a telemetric film record.

Another object is to provide a device for reproducing traces recorded on a telemetric film record in such a way as to amplify the variations in and reduce the overall length of said traces.

Another object of this invention is to provide a method and means for forming on a recording instrument indicia corresponding to calibration pulse marks recorded on a telemetric record film.

Another object is the provision of means for reproducing the time scale on a telemetric record film.

Other objects and many of the attendant advantages of this invention will be readily appreciated as the same becomes better understood by reference to the following detailed description when considered in connection with the accompanying drawing which is a diagrammatic view showing the various components and their relationship comprising the present invention.

Referring now to the drawing wherein a preferred embodiment of the present invention is illustrated in diagrammatic form, 10 represents a record instrument shown as a length of film upon which is recorded in the form of fluctuating traces 11 the various flight characteristics of a missile, such as fuel consumption rate, velocity, acceleration, altitude, etc., concentrated across the width of the film. The telemetric record film 10, which usually consists of a section of 35 millimeter film several yards long, extends over guide pulleys or rollers 12, 13, and 14 and is wound on drums 15 and 16, drum 15 being connected by suitable power transmission means to a variable ratio drive box 17 which in turn is driven from a variable speed motor 18. In its movement from drum 16 to drum 15 during the operation of the apparatus film 10 travels past and in close proximity to a function selector plate 19 having an aperture 20 therein of a size to allow the projection of a selected flight performance characteristic line onto the light sensitive recording instrument 21 which forms the final reduced record.

The system for projecting the selected flight characteristic line or function onto sensitized paper 21 comprises a light source 22 positioned adjacent to the film 10 and a suitable optical system including lenses 23 and 24 having a common axis. A second optical system including lenses 25 and 26 is provided for projecting the entire width of film 10 onto a ground glass operator's screen 27 for a purpose to be described later.

The strip of recording paper 21 comprising the recording instrument is wound on reels 28 and 29 and extends over a recording drum 30 which rotates about an axis aligned with the common axis of lenses 23 and 24. Recording paper 21 is caused to move from one reel over the recording drum to the other reel by means of a suitable drive connection, between the reel 29 and the variable ratio drive box 17 which drives the paper 21 at a predetermined rate which is substantially less than the rate at which the film 10 travels from drum 16 to drum 15. Mounted adjacent the recording drum 30 is a mask 31 having a slot 32 therein. The mask, although shown as being spaced somewhat from drum 30, must in practice be placed in close proximity thereto or a suitable elongated lens employed to avoid image diffusion. A small increment of the enlarged image of the selected flight characteristic line on film 10 is projected onto the light sensitive paper 21 through slot 32 to form on said paper a trace 61 corresponding to said line but with the fluctuations in said trace amplified transversely of the length of the light sensitive paper and compressed longitudinally thereof so as to materially shorten the length of the record.

In addition to the lines representing the flight characteristics of the missile there are also recorded on the telemetric film record 10 a series of indicia 33 resulting from the periodic transmission of "in flight calibration pulses" from the missile, which pulses and their resultant indicia serve to establish a datum from which the true value of the various flight characteristics may be measured. These calibration pulses are made necessary because of a constant drain on the missile transmitter power supply during flight which results in the transmission of signals of progressively smaller amplitude. Therefore, in order that the true value of the various recorded functions may be ascertained from the final reduced record, the calibration pulse marks, or reference indicia, must be reproduced on the recording instrument in the proper relationship to the selected performance characteristic line. This is accomplished by means of a calibration plate 34 provided with a plurality of knife edge fingers 35 which are adjustably mounted on the plate and are caused to reciprocate across slot 32 in the mask 31 by means of a variable speed motor 36, eccentric 37 and link 38 so as to produce reference indicia consisting of a series of dotted calibration lines 39 on the recording instrument. The distances between the fingers 35 are adjusted in accordance with the lateral distances between the "in flight calibration pulse marks" 33 as they appear on the film 10 which latter distances are determined by projecting film 10 onto the operator's screen 27 by means of the optical system comprising light source 22, and lenses 25 and 26. The ground glass screen 27 has mounted thereon a movable scale 40 which is calibrated in the same units as the scale 41 on the calibration plate 34 whereby the relative positions of the calibration pulses 33, with respect to each other and with respect to datum line 42 may be determined by reference to the scale 40. The fingers 35 on the calibration plate are then accurately spaced by positioning the fingers so as to coincide with the markings on scale 41 obtained from scale 40 to provide on the recording instrument datum lines from which the true value of a selected point on the recorded trace may be measured in appropriate units such as feet, pounds, degrees, etc. Inasmuch as the calibration lines are produced on the final record by the action of fingers 35, it is desirable to prevent the pulse marks 33 on the film 10 from also being projected onto the light sensitive paper 21. To this end, there is provided a blanking shutter 43 operated by a solenoid 44 which is energized by the closing of an operator's blanking switch 45 to move the blanking shutter 43 across lens 24 and cut off the projection of the film record 10 during those periods in which the flight calibration pulse marks are moving past aperture 20 in the selector plate 19.

Film record 10 also includes a series of time marks or indicia 46 which are reproduced on the recording instrument by means of a system now to be described. It is apparent that if an attempt were made to record the time marks 46 directly from the film 10 in the same manner as the flight characteristic lines are recorded, the result would be a substantially continuous line since the recording paper 21 moves at a much slower rate than the film record 10. Thus, in order to produce on the recording instrument a time scale which is useful there is provided a pulse counting and dividing system for providing indicia at intervals which are multiples of the intervals between time marks or indicia on the film record 10. This system includes sensing means illustrated as a photo cell 47 which transmits a pulse to a pulse counter 48 each time a time mark on the film record 10 moves past an apertured mask 49 to interrupt a beam of light from light source 50. Counter 48, responsive to a predetermined number of pulses resulting from the movement of a corresponding number of time marks past the aperture in mask 49, generates a pulse which is fed into pulse divider 51, the number of pulses required to actuate the counter being determined by the setting of a preset selector 52. Pulse divider 51 in response to the signals from counter 48 generates a series of energizing pulses having a recurrence frequency which may be submultiples of the pulse frequency detected by photo cell 47. These energizing pulses, occurring at intervals of .1 second, 1 second, and 1 minute, for example, are conducted by divider output lines 53, 54, and 55 to time marker lamps 56 through on-off series switches 57. Lamps 56 glow momentarily in response to the energizing pulses and may through an appropriate optical system 56A cause a series of different sized indicia 58 corresponding to .1 second, 1 second, and 1 minute to be reproduced on the light sensitive recording paper 21. The optical system 56A, while shown as a single lens for the sake of clarity, may in actual practice comprise a three lens system or its equivalent so that the light beams from the three lamps 56 will be superimposed in the proper position on paper 21.

The record film transport system including pulleys 12, 13, and 14, drums 15 and 16, and a portion of the time mark reproducing system, namely lamp 50 and its associated lens, mask 49, and photocell 47, are preferably mounted on a shiftable carriage, not shown, whereby record film 10 may be shifted relative to mask 19 to align a selected one of the channels on the film with aperture 20 in mask 19 so as to permit the projection of a selected recorded trace 11 onto recording paper 21.

A signal derived from the pulse counter 48 and acting through an automatic stop circuit 59 and speed control 60 serves to stop the operation of the apparatus after the preselected portion of the selected trace 11 on film record 10 has been projected onto recording paper 21.

The operation of the device is as follows: The record instrument 10 and the light sensitive recording instrument 21 are mounted on their respective drums and the position of record 10 is adjusted relative to function selector plate 19 so as to permit the projection of a selected trace onto recording instrument 21 whereupon the light and power sources are energized to move the record instrument 10 until the calibration pulse marks or indicia 33 appear on the operator's screen 27. The relative positions of the marks are determined by means of movable scale 40 and the scale readings thus obtained are used to set the knife edge fingers 35 on the calibration plate 34. The system is again energized whereupon the selected performance characteristic line or trace recorded on the record instrument is reproduced on recording instrument 21, the blanking switch 45 being depressed to prevent the projection of the calibration pulse marks 33 onto the light sensitive recording instrument. The optical system 23, 24 causes the fluctuations in the trace to be amplified so that the variations in the trace reproduced on the recording instrument 21 are enlarged relative to variations in the trace recorded on the record instrument, but inasmuch as recording instrument 21 travels at a much slower velocity than the record instrument 10, the trace formed on recording instrument 21 is compressed in a longitudinal direction with the result that the overall length of the record is materially shortened.

Obviously many modifications and variations of the present invention are possible in the light of the above teachings. It is therefore to be understood that within the scope of the appended claims the invention may be practiced otherwise than as specifically described.

What is claimed is:

1. An apparatus for reproducing a record instrument divided longitudinally into a plurality of channels within the bounds of each of which is recorded a trace extending lengthwise of the instrument comprising a projection system including a light source, means for moving the record instrument through a light beam produced by said source, a light sensitive recording instrument, means for moving said recording instrument through said light beam at a speed different than the speed of the record instrument, said projection system causing an image of said traces to be formed in the plane of said recording instrument, a slotted mask between said record instrument and said recording instrument for permitting a small increment of said projected image to pass through to said recording instrument, and a selector plate positioned in the path of said light beam, said selector plate having an aperture therein of a diameter equal to the width of one of said channels, and carriage means supporting said record instrument and being shiftable transversely of said selector plate whereby said plate aperture may be aligned with a selected one of said channels to permit the projection of a selected trace onto said recording instrument.

2. A combination as set forth in claim 1 wherein said record instrument further has recorded thereon a plurality of laterally spaced calibration marks, a calibration plate provided with a plurality of adjustable parallel knife edge fingers whereby said fingers may be spaced in relation to the spacing between the calibration marks on the record instrument, and means for reciprocating said fingers across the slot in said mask whereby to intermittently interrupt said light beam and produce on said recording instrument a plurality of spaced parallel calibration lines corresponding to said calibration marks.

3. A combination according to claim 2 wherein there is further provided a shutter and manually operable means for moving said shutter across said light beam whereby projection of said record instrument onto said recording instrument may be interrupted during the movement of the calibration marks through said light beam.

4. The combination according to claim 3 wherein there is further provided a ground glass screen and a second set of lenses for imposing another light beam from said light source onto said record instrument whereby to project said calibration marks onto said screen, a movable scale on said screen for determining the spacing of said marks, and scale on said calibration plate for spacing said knife edge fingers in relation to the spacing of said marks as obtained from said movable scale.

5. The combination according to claim 1 wherein the record instrument further has recorded thereon a scale comprising a series of indicia extending lengthwise thereof, and means for reproducing on said recording instrument indicia at intervals which are related to the intervals between indicia on the record instrument simultaneously with the reproduction of said trace.

6. The combination according to claim 5 wherein said reproducing means includes a light sensitive means, a second light source and lens system for imposing a beam of light onto record instrument and onto said light sensitive means, the movement of said indicia past said last-mentioned light beam causing said light beam to be intermittently interrupted whereby a series of electrical impulses are generated by said light sensitive means, an electrical circuit including means for generating in response to said impulses a second series of impulses at a frequency which is related to the frequency of the first-mentioned impulses, and marker lamps adjacent to said recording instrument which glow momentarily in response to said impulses of reduced frequency to provide on said recording instrument a series of indicia.

References Cited in the file of this patent

UNITED STATES PATENTS

| 1,661,034 | Duda | Feb. 28, 1928 |
| 2,159,969 | Furst | May 30, 1939 |
| 2,604,955 | Hawkins | July 29, 1952 |
| 2,646,334 | Marchand | July 21, 1953 |

FOREIGN PATENTS

| 417,645 | Great Britain | Oct. 1, 1934 |
| 775,156 | France | Dec. 31, 1934 |
| 961,567 | France | May 15, 1950 |